United States Patent
Reuter

(10) Patent No.: US 6,855,176 B1
(45) Date of Patent: Feb. 15, 2005

(54) EMULSION CRYSTALLISATION WITH RECYCLE

(75) Inventor: Karl Reuter, Freiburg (DE)

(73) Assignee: Reuter Chemische Apparatebau KG [DE/DE], Freiburg (DE)

( * ) Notice: Subject to any disclaimer, the term of this patent is extended or adjusted under 35 U.S.C. 154(b) by 0 days.

(21) Appl. No.: 09/936,527

(22) PCT Filed: Mar. 8, 2000

(86) PCT No.: PCT/EP00/02001

§ 371 (c)(1),
(2), (4) Date: Sep. 14, 2001

(87) PCT Pub. No.: WO00/54865

PCT Pub. Date: Sep. 21, 2000

(30) Foreign Application Priority Data

Mar. 17, 1999 (EP) .............................. 99200820

(51) Int. Cl.$^7$ ................................. B01D 9/00
(52) U.S. Cl. ................ 23/296; 23/295 R; 23/297; 23/299; 23/301
(58) Field of Search .............................. 23/295 R, 301, 23/296, 297, 299

(56) References Cited

U.S. PATENT DOCUMENTS

| 3,141,743 A | | 7/1964 | Marsh | |
| 4,010,142 A | * | 3/1977 | Hurlock et al. | 564/206 |
| 5,872,259 A | * | 2/1999 | Reuter | 548/267.8 |
| 6,428,583 B1 | * | 8/2002 | Reuter | 23/296 |

FOREIGN PATENT DOCUMENTS

WO  WO 97/32644 A1  9/1997

OTHER PUBLICATIONS

Davey et al. "Purification of molecular mixtures below the eutectic by emulsion crystallization", Jun. 22, 1995, Nature, vol. 375, pp. 664–666.*

* cited by examiner

*Primary Examiner*—Stuart L. Hendrickson
(74) *Attorney, Agent, or Firm*—Burns, Doane, Swecker & Mathis, L.L.P.

(57) ABSTRACT

A method for purifying substances through emulsion crystallisation is described, whereby (a) an emulsion of organic liquid droplets in a continuous water phase containing the impure substance is formed; (b) the emulsion is supersaturated in the substance; (c) crystallisation of the substance in the water phase is induced; (d) the crystals of the substance are isolated from the from emulsion, yielding an emulsion-filtrate; (e) additional impure substance is dissolved in the emulsion-filtrate; and (f) steps (b)–(d) are repeated with the emulsion obtained from step (e).

10 Claims, No Drawings

EMULSION CRYSTALLISATION WITH RECYCLE

BACKGROUND OF THE INVENTION

The present invention relates to a process for purifying an impure substance through emulsion crystallisation. In particular, the present invention enables the preparation of highly purified crystalline materials at high yields.

Crystallisation of substances from emulsions is well known. C.f. EP 0 548 028 A1 and WO 97/32644, both belonging to the inventor of the present invention. In such emulsion crystallisation processes, an emulsion is formed of organic liquid droplets in a continuous water phase. Then, a mixture of substances is dissolved in the emulsion, and the emulsion is supersaturated in the desired substance of the mixture. The desired substance is then allowed to crystallise in the water phase, optionally with the aid of seed crystals.

The present invention builds upon this technology to enable ultra-high purification of substances at high yields. As such, the present invention vastly increases the commercial potential of emulsion crystallisation processes.

The aforementioned patent publications describe emulsion crystallisation processes for purifying substances which optionally can be carried out continuously. In these processes, crystals that are formed are filtered off from the emulsion, and the resulting emulsion-filtrate is heated. The heated emulsion-filtrate is then contacted with impure substance in a column that is kept separate from the vessel in which crystallisation takes place. This serves to re-load the emulsion-filtrate with impure substance, which is then filtered and cooled and reintroduced into the crystallisation vessel.

Carrying out emulsion crystallisation continuously, as described in these patent publications, can lead to some difficulties. The equipment it requires is somewhat complicated, requiring the external column, two filters and two heat exchange units. The external column and the filters are susceptible to clogging. The process risks losing emulsion during the removal of undissolved leftover crude materials in the column, which will reduce its efficiency. Re-loading of impure substance in the external column occurs without the benefit of stirring, which also reduces its efficiency.

Another disadvantage of some emulsion crystallisation processes is that their yields following a single crystallisation step can be substantially lower than the corresponding yields obtained by classical crystallisation due to difficulty in removing solvents from the mother liquor. Or the emulsion cannot be highly loaded with impure substance as this would lead to emulsion instability, unworkable viscosity and/or sub-optimal growth conditions for the crystals.

SUMMARY OF THE INVENTION

The present invention overcomes the disadvantages of the prior art by providing a simplified method for carrying out emulsion crystallisation with recycle of emulsion. The present invention also provides a method for obtaining substances at ultra-high purity levels and at excellent yields. According to the invention, a process is provided for purifying an impure substance through emulsion crystallisation comprising the steps of (a) forming an emulsion of organic liquid droplets in a continuous water phase, which emulsion contains the impure substance; (b) super-saturating the emulsion in the substance; (c) inducing crystallisation of the substance, whereby crystallisation takes place in the water phase; (d) isolating the crystals of the substance from the emulsion, yielding an emulsion-filtrate; (e) dissolving additional impure substance in the emulsion-filtrate; and (f) repeating steps (b)–(d) with the emulsion obtained from step (e).

DETAILED DESCRIPTION OF THE INVENTION

Impure substances to be purified according to the present invention can be any substances that lend themselves to emulsion crystallisation processes. The starting impure substance will typically contain >60% by weight purity of the substance, preferably >70%, more preferably >80%. Particularly good results have been found in cases >95% purity, which have led to final purity of the substance of e.g. >99.9%.

Emulsions and their formation are well-known in the art. Emulsions are, by definition, "droplets" dispersed in a "continuous phase". In the present invention, the droplets are organic liquid droplets and the continuous phase is a water phase.

The emulsion optionally contains additives such as surfactants and dispersants, known in the art, for assisting formation and stabilization of the emulsion, and for facilitating the transport of the substance out of the organic liquid droplets and into the water phase, where crystallisation takes place on a crystal surface (i.e. either the seed crystal or spontaneously formed crystal). Such surfactants and dispersants will be chosen according to the nature of the emulsion, and can be nonionic, anionic and/or cationic. The additives will normally be present in an amount of 0.01–30 w/w %, preferably 0.1–20 w/w %.

The droplets typically vary in diameter from approximately 0.05 to 80 $\mu$m. Droplets with diameter in the range of 0.3 to 80 $\mu$m are known as "macrodroplets", and the emulsions as "macroemulsions". Droplets with diameter in the range of 0.05 to 0.3 $\mu$m are known as "microdroplets", and the emulsions as "microemulsions". For the sake of simplicity, the terms "droplets" and "emulsions" as used herein encompass both macro- and microdroplets and macro- and microemulsions.

The organic liquid phase of the droplet will be water insoluble. 'Water insoluble' in this context means anything less than water miscible, though in most cases the organic liquid phase will mix with water in an amount not more than 30% w/w at the temperature at which crystallisation takes place.

The emulsion may further contain a buffering agent, such as sodium acetate and acetic acid, for maintaining pH of the emulsion at a desired level, antifreezing agents and solubility adjusting agents, as is known in the art; and may also contain a solubilizer for the impure substance, such as acetone or methanol, which can be easily removed following crystallisation and re-used.

The emulsion can be super-saturated, and crystallisation induced, by any conventional means. Typically, super-saturation will be accomplished by cooling the emulsion. Crystallisation can be initiated either spontaneously, or by seeding with the seed crystals of the substance.

Formation of the original emulsion, as well as re-loading of emulsion-filtrate with impure substance, can be carried out in the vessel in which crystallisation take places, or can be carried out in a separate vessel. This separate vessel will preferably be equipped with stirring, high shear equipment and/or heating means so that an optimum emulsion can be produced.

Isolation of crystals from the emulsion can be carried out by any conventional means, such as filtration or centrifuge. Centrifuging is preferred, since it results in a higher percentage of the emulsion-filtrate being separated from the crystals.

The emulsion-filtrate obtained following isolation of crystals is then 'reloaded' with impure substance, i.e. impure substance is added to it, and dissolved. Dissolving can be carried out by any conventional means, e.g. any one or more of ultrasound, heating and stirring.

Following re-loading and dissolving of the impure substance, the emulsion-filtrate is treated like the original emulsion and is further processed as before, i.e. super-saturated in the substance, crystallisation is induced and the crystals are isolated. Recycling of emulsion-filtrate can be carried out as many times as yields acceptable results. With increasing repetition of recycling of emulsion-filtrate, there is a risk that the purity of crystals isolated will decrease as the level of impurities in the emulsion builds up.

Isolated crystals of substance can be washed as known, e.g. with water, optionally containing surfactants. Applying washing water to the crystals as they are being centrifuged provides a particularly convenient means for carrying out the process.

Representative examples falling within the scope of the present invention but not intended to limit the scope of the present invention follow:

EXAMPLE 1

Fluorene 120 g of technical grade fluorene (85% purity) are added to one liter of a micro-emulsion formed from 10% acetophenone, 50% acetone, 10% Synperonic NP 10 (a nonylphenol surfactant, ethoxylated with 10 mol ethyleneoxide; ICI PLC, England) and 30% water. Heating to 95–100° C. dissolves all of the fluorene to provide a clear emulsion. Cooling to room temperature super-saturates the emulsion and yields crystals of fluorene within one hour.

The purified crystals are isolated from the emulsion by centrifuging, and the emulsion-filtrate is set aside. The crystals are washed with a total of 0.5–2 liters of water whilst being centrifuged to remove excess water, and dried at 50–60° C. Alternatively to being washed in the centrifuge, the crystals may be dispersed in water, and this dispersion, then, centrifuged and dried.

The emulsion-filtrate is now re-loaded with 80 g of the same technical grade fluorene, which is then heated at 95–100° C. to dissolve all of the fluorene. The resulting emulsion is treated as before, to yield purified crystals and emulsion-filtrate. This procedure is again repeated so that a total of three crystallisations are carried out. The fluorene crystals produced have a purity on the order of 95%. The total yield obtained from 1 liter emusion following three crystallisations is 83.5% This compares with a yield of 70.6% following a single crystallisation.

EXAMPLE 2

2,4-Dintrophenol 140 g of 2,4-dinitrophenol (97% purity) are added to 2 liters of a solution consisting of 2% Soprophor FL (a surfactant), 2% polyvinylalcohol (m.w. 15,000), 2.5% benzonitrile and 93.5% water. The 2,4-dinitrophenol is dissolved, and the solution is emulsified by heating to 90–95° C. and applying ultrasound. Any remaining solids are filtered off. The emulsion is cooled to room temperature over a period of 16 hours, during which 2,4-dinitrophenol crystallises as rectangular plates. These crystals are filtered and washed with 0.5 liters 1% Synperonic NP 10 solution and 1 liter water. The resulting crystals have a purity of >99.9%.

The emulsion-filtrate is re-loaded with 93.5 g of the 97% 2,4-dinitrophenol and re-emulsified. The emulsion is further treated as described in the previous paragraph. The process is then repeated a third time.

EXAMPLE 3

Anthracene 15 g of technical grade anthracene (94.5% purity) are added to 1.5 liters of a micro-emulsion formed from 10% benzonitrile, 50% N-methylpyrrolidinone, 10% Synperonic NP 10 and 30% water. Heating to 95–100° C. dissolves all of the anthracene to provide a clear emulsion. Cooling to room temperature super-saturates the emulsion and yields crystals of anthracene within two hours.

The purified crystals are isolated from the emulsion by centrifuging, and the emulsion-filtrate is set aside. The crystals are washed with a total of 0.5–2 liters of water, centrifuged a second time, and dried at 50–60° C.

The emulsion-filtrate is now re-loaded with 15 g of the same technical grade anthracene, which is then heated at 95–100°C. to dissolve all of the anthracene. The resulting emulsion is treated as before, to yield purified crystals and emulsion-filtrate. This procedure is again repeated so that a total of three crystallisations are carried out. The anthracene crystals produced have a purity on the order of 99.8%. The total yield obtained from 1.5 liters emusion following three crystallisations is 86.9% This compares with a yield of 82.1% following a single crystallisation.

What is claimed is:

1. A process for purifying an impure substance through emulsion crystallization comprising the steps of (a) forming an emulsion of organic liquid droplets in a continuous water phase, which emulsion contains the impure substance;

(b) super-saturating the emulsion in the substance;

(c) inducing crystallization of the substance, whereby crystallization takes place in the water phase;

(d) isolating the crystals of the substance resulting from step (c) from the emulsion, yielding an emulsion-filtrate;

(e) dissolving additional impure substance in the emulsion-filtrate; and (f) repeating steps (b)–(d) with the emulsion obtained from step (e), whereby the level of impurities builds up in the emulsion with the repetition of steps (b) to (d).

2. A process according to claim 1 wherein crystals are isolated from emulsion in step (d) by centrifuge.

3. A process according to claim 1 wherein the emulsion is a micro-emulsion.

4. A process according to claim 1 wherein the emulsion is a macro-emulsion.

5. A process according to claim 1, wherein dissolving of additional impure substance in step (e) is carried out by ultrasound, heating and/or stirring.

6. A process according to claim 1, wherein the crystals isolated in step (d) are washed with water optionally containing surfactant.

7. A process according to claim 6 wherein the washing water is applied to the crystals during centrifuging.

8. A process according to claim 1, wherein crystallization is induced by seeding with seed crystals of the substance.

9. A process according to claim 1, wherein dissolving of additional impure substance in step (e) is carried out by stirring.

10. A process according to claim 1, wherein dissolving of additional impure substance in step (e) is carried out by ultrasound and/or heating.

* * * * *